United States Patent [19]

Boussageon

[11] 4,034,657
[45] July 12, 1977

[54] MANUFACTURE OF RECEPTACLES

[75] Inventor: Pierre Boussageon, Paris, France

[73] Assignee: Societe Generale pour l'Emballage, Paris, France

[21] Appl. No.: 551,329

[22] Filed: Feb. 20, 1975

[30] Foreign Application Priority Data

Feb. 20, 1974 France .............................. 74.05681
Feb. 21, 1974 France .............................. 74.05901
Feb. 22, 1974 France .............................. 74.06111

[51] Int. Cl.² ......................................... B31B 3/74
[52] U.S. Cl. .................................. 93/39.3; 93/39 C
[58] Field of Search ................. 93/39.3, 39 C, 39.2, 93/39.1 R, 39.1 P, 44.1

[56] References Cited

U.S. PATENT DOCUMENTS

| 2,819,659 | 1/1958 | Scott et al. | 93/39.3 |
| 3,289,552 | 12/1966 | Corazzo | 93/39.3 |
| 3,463,060 | 8/1969 | Chebuhar | 93/39 C X |
| 3,468,226 | 9/1969 | England et al. | 93/39.3 |

Primary Examiner—Leon Gilden
Attorney, Agent, or Firm—Karl W. Flocks

[57] ABSTRACT

A method and apparatus are described for manufacturing receptacles such as yoghurt pots having a bottom at one end and a cover or border at the other end. A body portion of the receptacle is formed from a blank at a first working station and transferred to second and third working stations where the bottom and border are applied. The border may comprise an edge rolled on itself and the body may be conical. A number of sets of stations may be mounted on a rotatable turret and the process may be made fully automatic.

12 Claims, 9 Drawing Figures

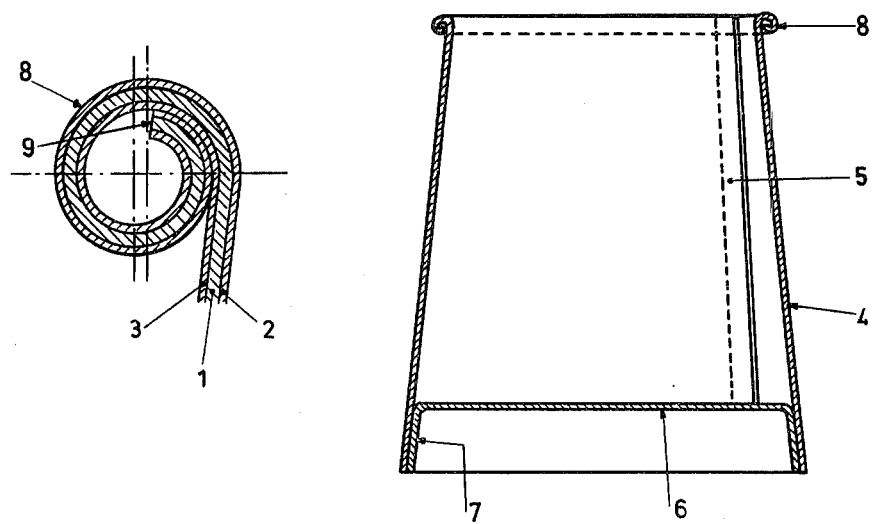
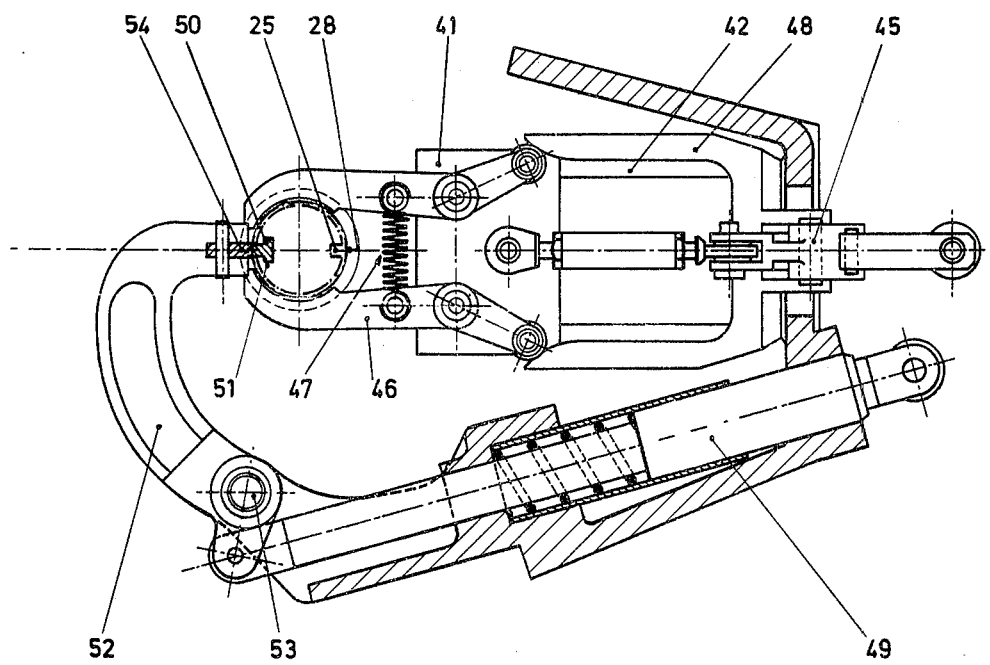

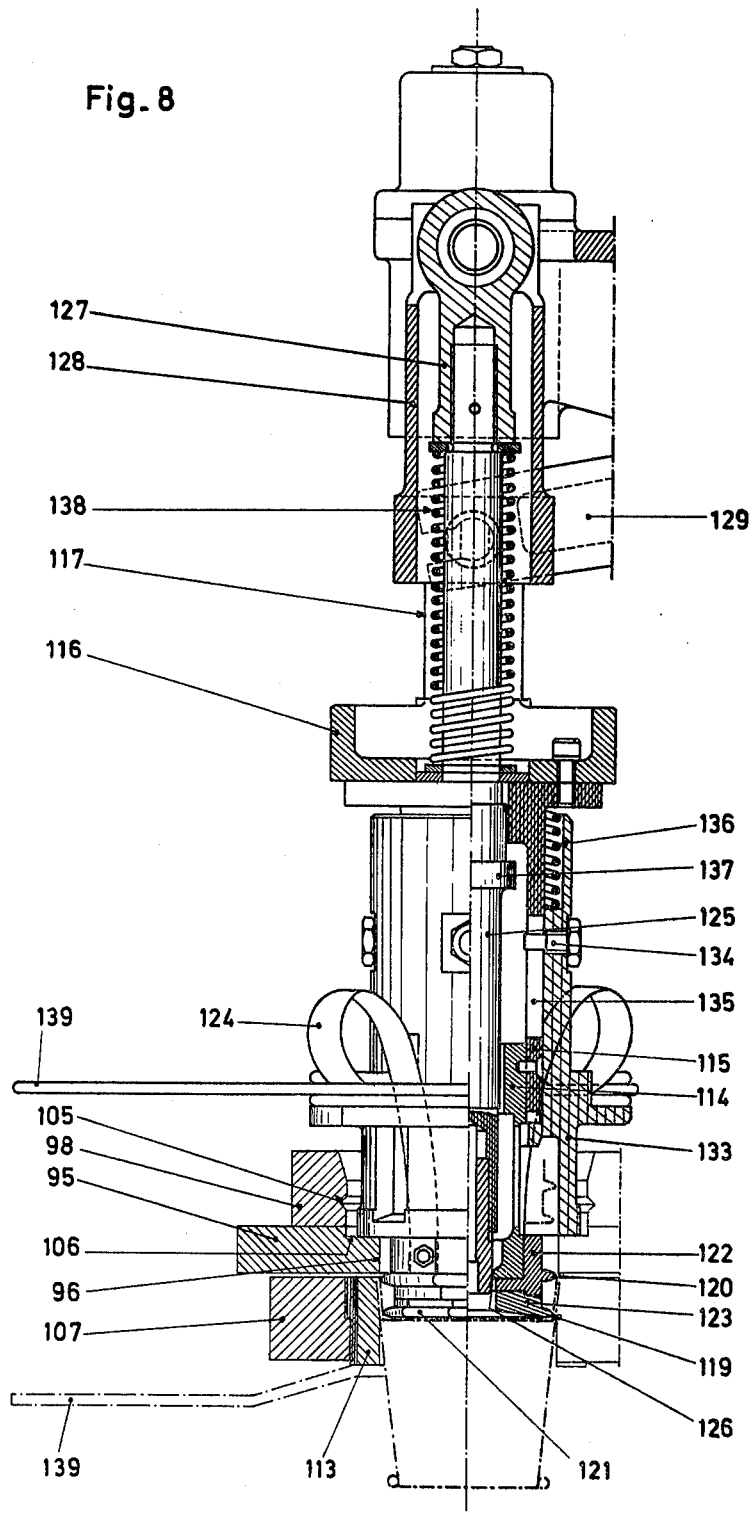

MANUFACTURE OF RECEPTACLES

BACKGROUND OF THE INVENTION

The invention relates to automatic manufacture of receptacles having thin walls such as various sorts of boxes, pots and cups.

These receptacles are generally formed from sheets of plastics material of metal sheets, greaseproof paper or, very frequently, complex products such as liminates of paper, aluminum and polyethylene. They comprise, very generally three elements that is:

A body defined by a wall of the receptacle, which may be shaped, for example, as a trunk of a cone, a cylinder, trunk of a pyramid or prism, A curved bottom at one end of the body of which the concavity may be directed towards the inside or the outside, A cover provided with a simple upper wall edge at the other end of the body; the wall edge may be formed by an associated element but also by a part attached to the upper edge of the body; it is generally intended to give to the receptacle a sufficient rigidity and possibly to receive a cover or lid.

Even if the receptacles are not formed by rotation about an axis it is possible to assign to the body a longitudinal axis which is generally perpendicular to the bottom of the receptacle.

According to the composition of the materials which are used in the manufacture of the receptacle, the elements may be joined by adhesion, welding, brazing or even by press-fitting. Possible processes used for welding include, in particular, welding by the Joule effect, by ultrasonics or by dielectric loss heating at high frequency.

As a general rule, the successive stages of manufacture are carried out in different machines between which the part-finished receptacles are transferred, optionally automatically by mechanical members which are moved in a plane perpendicular to the axis of the receptacles for transporting the receptacles to successive work stations.

It is known, in particular, to roll on a preformed bottom a blank of convenient shape, to join the blank to the bottom while closing the blank by welding to form the body then to finish the upper edge of the receptacle by pressing either at a low or high temperature.

In general, the tools used at different working stations comprise essentially two complementary members situated on the same axis corresponding to that of the receptacle and intended to be positioned on either side of the wall to be operated on, that is:

A female member formed generally of at least two jaws surrounding the exterior of the body and a male organ penetrating inside the opening of the latter.

GENERAL DESCRIPTION OF INVENTION

The invention is intended to render manufacture of such receptacles completely automatic with a rate of production which is very high, which cannot be obtained with equipment known at present, and to facilitate maintenance while limiting the duration of downtime in the case of breakdown.

According to the process of the invention the transfer of the part-finished receptacle between working stations may be carried out by means of the tools which perform the desired operations on the receptacles without the use of separate transporting members.

According to one aspect of the invention, there is provided a method of automatically making thin-walled receptacles comprising a wall defining a body having apertures at opposite ends thereof, a curved bottom attached to one end and a cover or border at the other end, the method comprising:

supplying a first working station with a blank for the body, forming the blank into the body on a support at the first working station, moving the body on the support to a second working station positioned along a longitudinal axis of the body when the latter is formed at the first station, providing one end of the body with the bottom or cover or border at the second working station by operating means, Grasping said one end by the operating means and tilting the body to prevent the other end of the body to a third working station, providing said other end with a cover or border or bottom at the third working station while grasping said other end, and releasing the receptacle, the aperture of the body at said one end is of a width which is lesser than or equal to that of the aperture at said other end.

In one embodiment of the invention the cover or border is provided at the narrower end of the body at the second working station. However if the receptacle has for example a conical shape having a larger opening provided with a rolled edge, the conical body will be made at the first station (A), the bottom of the receptacle will be mounted at the second station (B) and rolling of the edge carried out at the third station (C). When the two ends of the body obtained at the first station have an identical width, the sides of the receptacle being parallel, the manufacturing operations for the ends of the body may be carried out in any order.

According to another aspect of the invention, there is provided apparatus for carrying out such a method which comprises:

A first working station provided with a jig for shaping the body from a blank and means for providing blanks to the jig, a second working station provided with means for applying a bottom or providing a coveror border on said one end of the body and for grasping said one end, said means being mounted to rotationally reciprocate about an axis transverse to said axis of the body, and a third station provided with means for applying a cover or border or a bottom to the other end of the body and for grasping said other end of the body when received from the second station, the stations being provided with means for displacing the body from one station to the next.

In a preferred embodiment, the three working stations in succession are positioned on the same line coincidental with the axis of the receptacle at the first station, the station B turning the workpiece on end at the end of the operation for movement to the station C.

Preferably, the machine comprises an assembly of operative rows formed of identical parallel lines of successive working stations, mounted to move along a closed path; advantageously this path is circular and the operating lines may thus be mounted on a turret rotating about an axis, the workpiece being displaced longitudinally for one station to the next as the assembly rotates.

The manufacturing operations at the different stations may be controlled by cams fixedly mounted on the frame of the machine; preferably the turret carrying the assembly of working stations is driven at uniform speed, each operating line being fed turn by turn during its passage by feeding devices fixed relative to the frame, the finished receptacles being ejected at a discharge station which is also fixed relative to the frame. The different workpieces thus progress during the course of manufacture according to a path which is more or less helicoidal.

The first station may comprise essentially a jig associated with means for mounting a blank thereon and an exterior clamp for rolling the blank, each of the two latter members being provided with electrodes for welding the blank along a generatrix.

The jig may comprise suction openings arranged in a manner to come tangentially into contact with a blank during displacement of the working stations; preferably the jig is mobile in translation and is also mounted rotatably about its axis under the action of a differential control immobilising the suction openings in relation to means for supplying the disc during entry in contact with the openings with said disc.

The stations for manufacture of the ends of the receptacle may comprise facing means for holding the body belonging to the previous station, a mandrel equipped with radially movable gripping members, this mandrel being movable in translation along its axis and being connected elastically to a member driven in translation along the same axis, the latter member having a conical bearing surface which causes at the end of the course of opening or closure of the gripping members of the mandrel.

The apparatus may comprise a station for rolling the upper edge of the receptacle, at which the mandrel has a plurality of external claws which are fixed with respect to rotation and is associated with an internal former which rotates arranged to cooperate with the interior of the edge of the workpiece, the claws surrounding with play the exterior of the edge facing said rotating former and being maintained closed while the former approaches means for holding the body; the angle of rolling of the edge thus formed is determined by the distance of approach.

During mounting of a bottom having concavity turned towards the exterior, the welding station for the bottom advantageously comprises means for supplying the bottom, a die plate having an opening for forming the bottom, a head having an expansible mandrel of which the gripping members have a bearing surface perpendicular to the axis of the mandrel, associated with a sleeve for pressing the bottom which cooperates with the rear surface of the die plate and an external pressing clamp, the mandrel and the clamp being provided with electrodes for welding along the periphery of the body. The desired shape of the bottom is obtained by pressing across the opening of the die plate and its position is then determined by the respective axial displacement of the clamp at the welding head.

DESCRIPTION OF PREFERRED EMBODIMENTS

Figure 2:
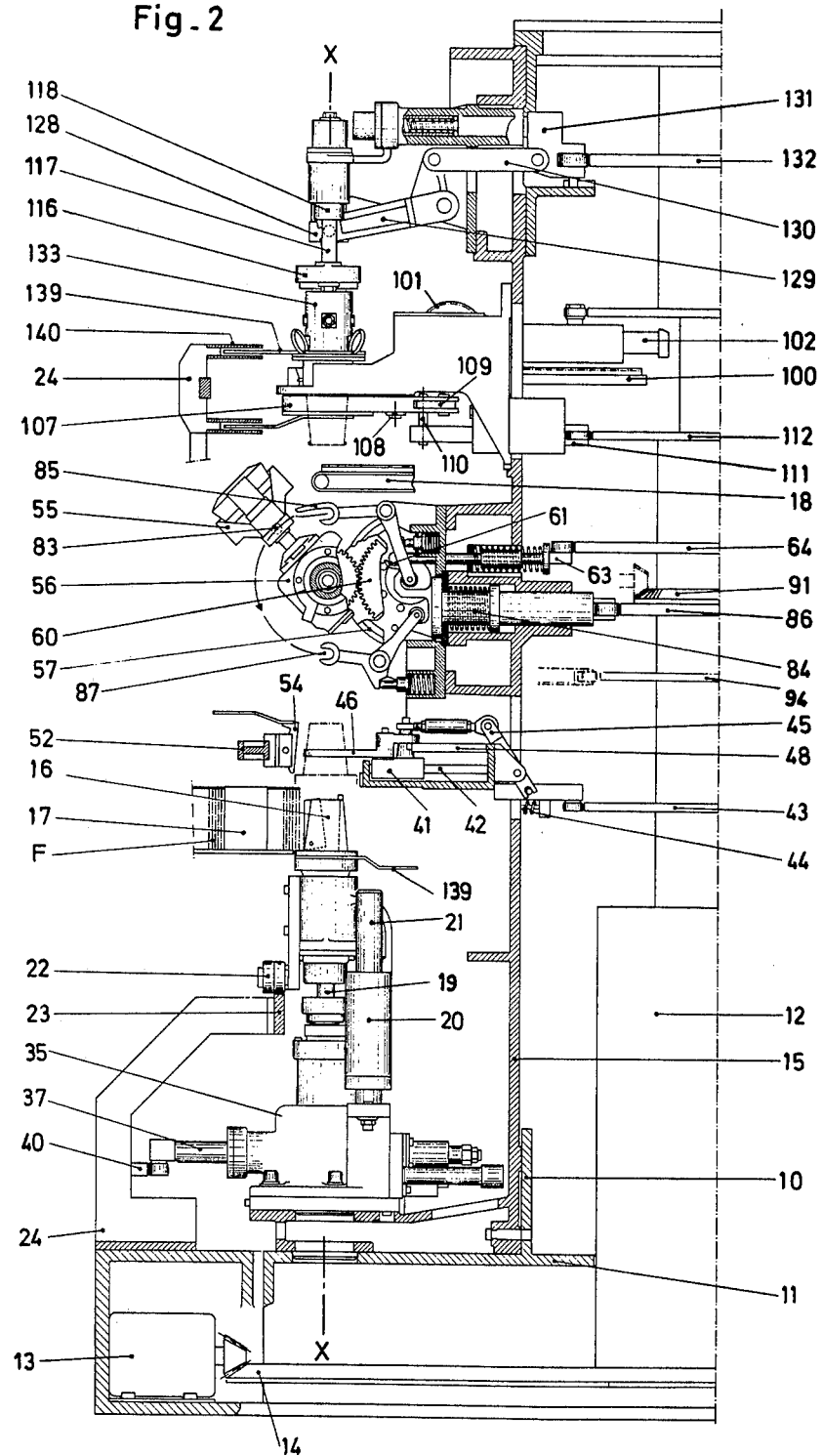
Figure 3:
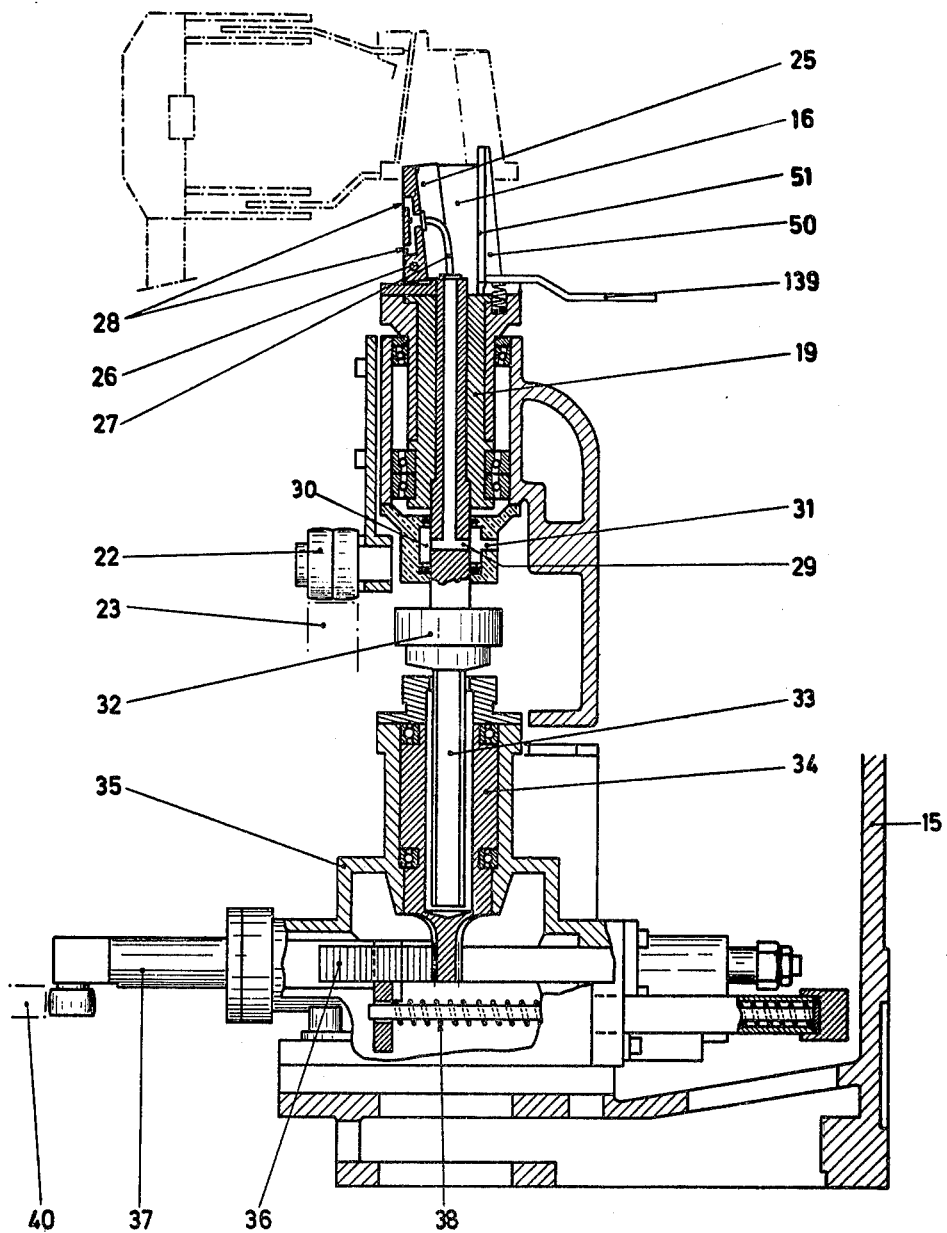
Figure 5:
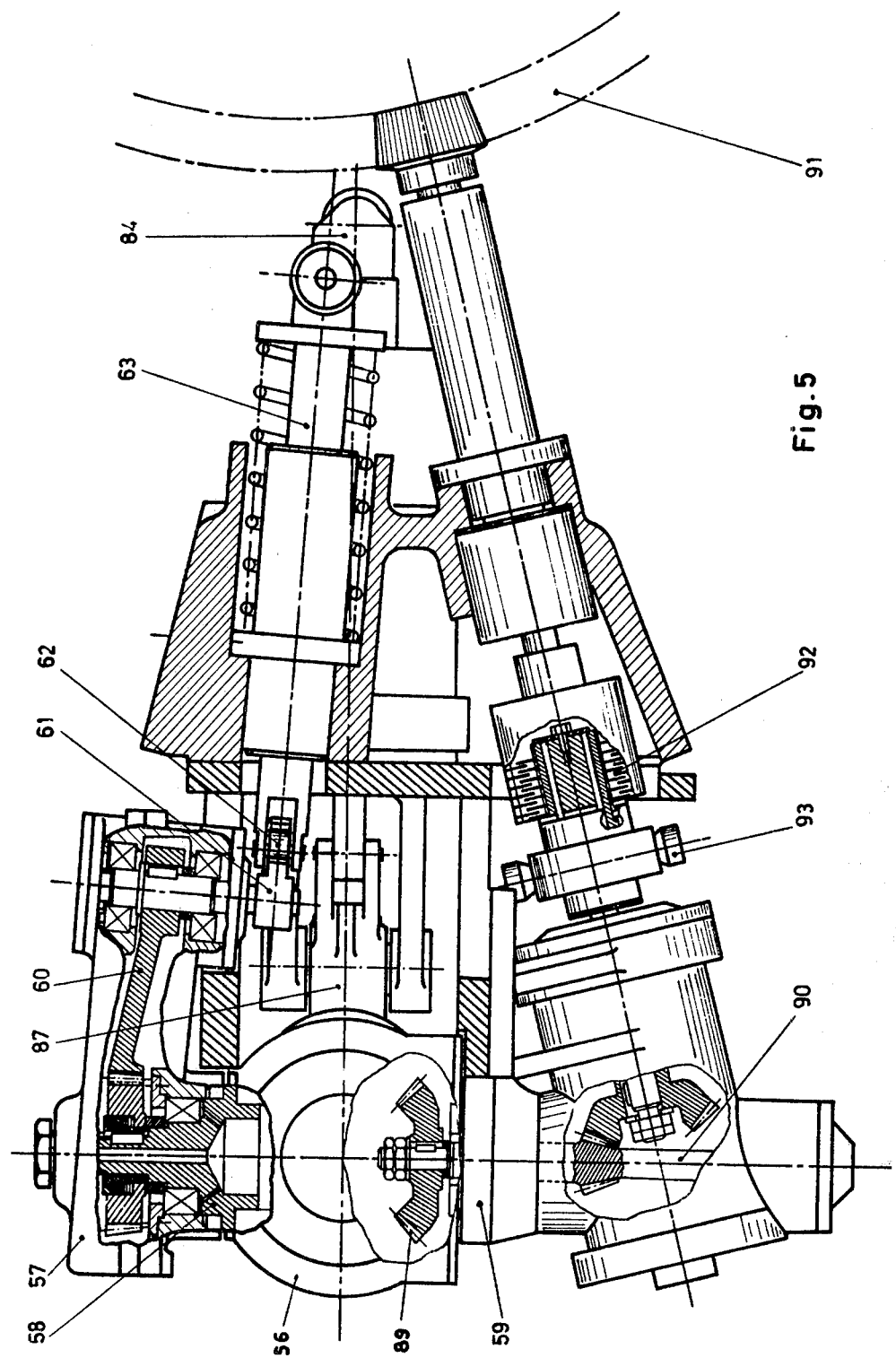
Figure 6:
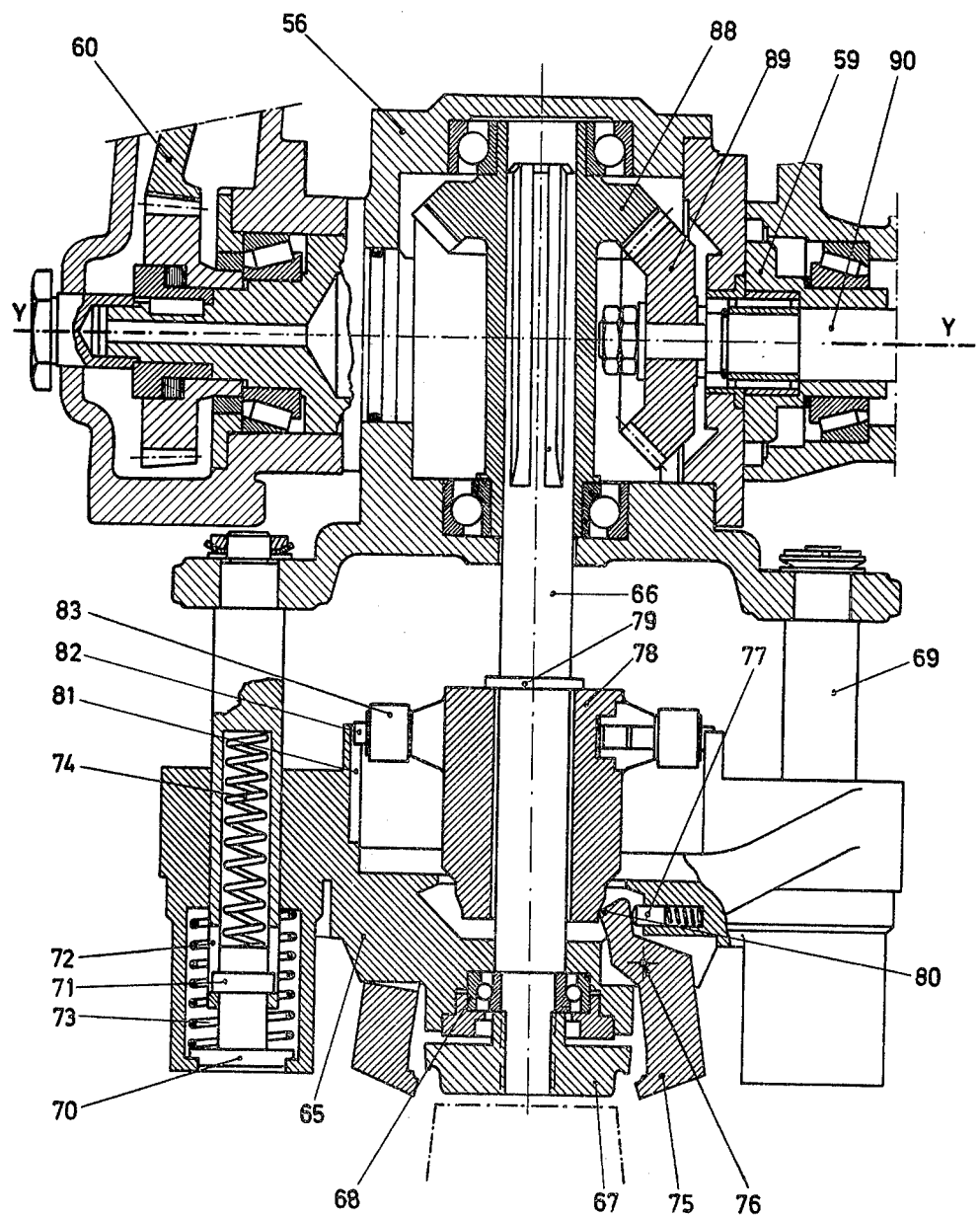
Figure 7:
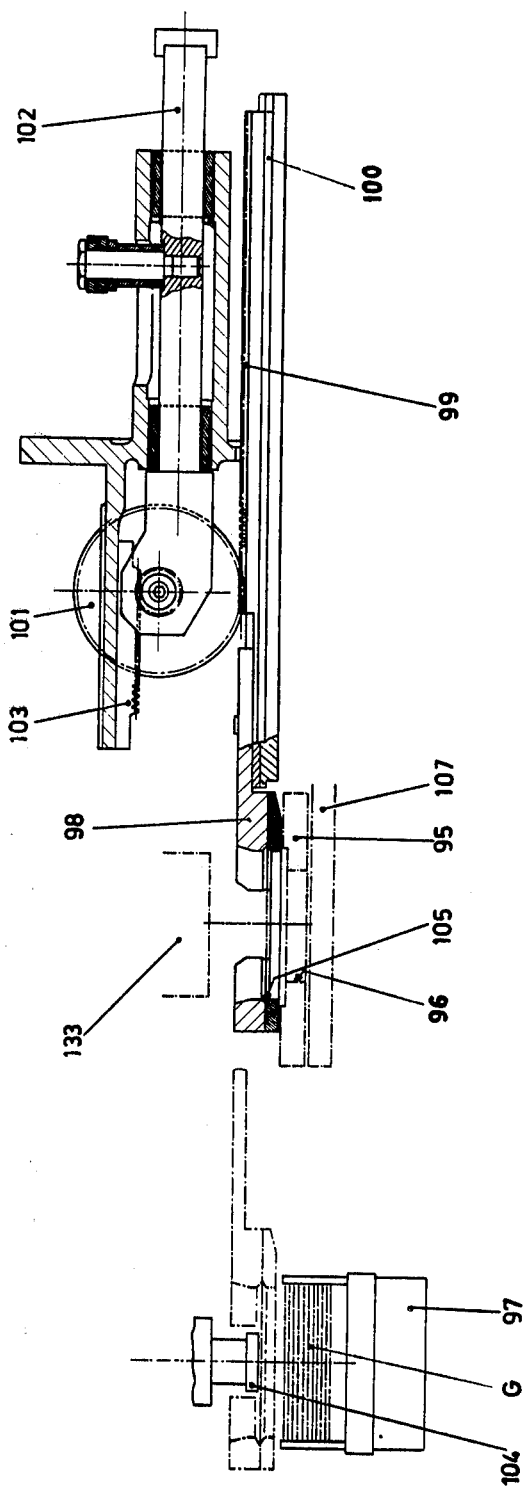

A preferred embodiment of the invention will now be described by way of Example with reference to the accompanying drawings, in which:

FIG. 1 is a section of a pot with a narrow opening having a rolled rim and a bottom having a concavity turned towards the exterior, FIG. 1a is a portion of FIG. 1 on an enlarged scale, FIG. 2 is a schematic view in elevation of a machine according to the invention provided with a succession of working stations, FIG. 3 is a schematic view in elevation with partial sections of part of the machine of FIG. 2, showing a lower column supporting a jig for forming the body of a pot, FIG. 4 is a plan view of part of the machine of FIG. 2 showing a clamp assembly for use during rolling and welding of the body, FIG. 5 is a plan view of part of the machine of FIG. 2 in partial section showing means for controlling of movements of the head for rolling and returning, FIG. 6 is a view in elevation in partial section of part of the machine of FIG. 2 showing the rolling head, FIG. 7 is a view in elevation in partial section of part of the machine of FIG. 2 including a head for shaping, positioning and welding the bottom of the pot, FIG. 8 is an elevation, partially in section, of the head for forming, positioning and welding the bottom.

This example relates to manufacture of yoghurt pots of conical shape equipped with a bottom of which the concavity is turned towards the exterior and of which the upper edge has a rolled edge. Each line of working stations of the machine comprise successively a first station for shaping the body of the receptacle, a second station for rolling the narrow edge of this body, for grasping said body by the rolled edge and rotating the body, and a third station for mounting a bottom at the opposite end of the body to the rolled edge, then taking and discharging the finished receptacle. The receptacle is a yoghurt pot, shown in FIGS. 1 and 1a.

This receptacle is formed of an assembly comprising at least one internal layer of paper 1 provided with two external layers 2 and 3 of weldable plastics material such as polyethylene and it comprises a truncated conical body 4 formed of a blank which is rolled on itself, the edges overlapping and being welded together along a line 5; inside this body is mounted a bottom 6 having a flange 7 of the same conicity as the body 4. The rim 8 of the pot opposite the bottom 6 is formed by rolling the free edge 9 of the blank on itself towards the exterior of the body 4, as shown in FIG. 1a.

A machine for making such a pot is shown in FIG. 2. A turret 10 is fixed to a plate 11 which is driven in continuous rotation about a central vertical column 12 by a motor 13 driving the toothed wheel 14. This turret carries a plurality of vertical lines of working stations spaced regularly along its periphery; the machine may comprise ten lines of working stations of which the respective cycles are staggered by a period of a tenth of one rotation of the turret but in the interests of clarity a single line of working along axis XX is shown in FIG. 2, the different stations being shown in their angular positions which are different with respect to the column 12 without taking account of synchronisation of their movements.

The stations of the same line are mounted on the same support 15; in the case of a breakdown of an element a single group of tools or alternatively the whole of the line of working stations may be replaced by a device in working conditions which allows reduction to the greatest possible extent of the period of immobilisation of the machine by reducing the time necessary for exchanging parts or adjusting the machine.

Each line includes at its lower part a station A. This station comprises a truncated conical jig 16 passing at the start of its cycle past a fixed distributor 17 for blanks cut to the required dimensions for taking up a blank which is then wrapped around the jig and welded (FIGS. 3 and 4) along the line of welding 5. The wrapped and welded blank which forms the lateral wall of the body 4 of the receptacle is immediately seized by tools operating at the second station B (FIGS. 5 and 6) at which the upper edge 8 is rolled on itself, then the blank is subjected to rotation through 180° about a horizontal axis and is taken to station C where mounting in position and then welding of the bottom 6 to the bottom 4 (FIG. 7) takes place. The finished receptacle is then removed by means of a conveyor 18.

The column 12 carries a plurality of discs or flanges comprising plate cams which serve to control the various operations during rotation.

An assembly of mechanical transmissions for effecting the above-mentioned operations comprises in a general manner push rods each provided with a wheel urged to engage a corresponding cam by a spring, these push rods being associated if required with levers. The purpose of these members is shown in the Figures but to simplify comprehension of this embodiment they are not described in detail; their construction and functioning are conventional and will be understood without difficulty from the drawings.

The working station A will now be described with reference to FIGS. 2 to 4. The jig 16 is integral with a shaft 19 mounted for rotation on a slider 20 carried by two columns 21 and provided with a roller 22 which cooperates with a track 23 forming a cam integral with the frame 24 of the machine so that the shaft 19 and the jig 16 may be vertically displaced during rotation of the working station about the column 12.

A part of the periphery of the jig 16 is formed by a box 25 articulated on a horizontal axis 26 and urged outwardly with respect to shaft 19 by a spring which is not shown, its median generatrix thus being positioned vertically projecting on the rest of the jig. The shaft 19 has an upper part which is hollow connected by a duct 27 to the box 25 provided with suction openings 28 placed on its external face and is connected by a hole 29 to the inside of the chamber 30 connected at 31 to a suction duct. The shaft 19 is connected by a coupling 32 to a grooved lower part 33 slidingly mounted inside a sleeve 34 carried by a unit 35 integral with the plate 11. The sleeve 34 engages a rack 36 mounted on a slider 37 moving radially against a spring 38 inside the unit 35 under the effect of a cam 40 integral with the frame of the machine to drive the jig in rotation.

The distributor 17 is placed along the path of the jig 16 at the lower part of the machine and the arrangement of the cam 40 is such that its profile acting on the slider 37 causes displacement of the rack 36 and consequently an abrupt reverse rotation of the jig 16 at the instant when it passes the distributor.

This rotation of the jig 16 compensating the rotation of the assembly of the device with respect to the frame of the machine, takes place as the orifices 28 of the box 25 are in contact with a blank F passing from the distributor 17 and immobilises them for an instant at the blank F which is thus picked up by suction by box 25; this allows extraction of the blank with certainty and precision after which the slider 37 has passed the cam 40 and the jig 16 returns to its initial angular position, the orifices 28 then facing the column 12.

At station A there is mounted a clamp 41 driven along a slider 42 by a cam 43 of the column 12 opposed to a spring 44 and acting on the transmission 45. This clamp is provided with two jaws 46 urged by a spring 47 towards a position of half opening, but it is maintained by the cam 43 in a rearward position open under the action of two members 48. At the moment when the cam 23 acting on the slider 20 raises the jig 16 carrying the blank F above the distributor 17 as far as station A. The cam 43 allows advance of the clamp 40 of which the jaws come into place about the jig 16 rolling the blank about itself to give it a truncated form with overlap of the edges of the blank while moving the aspiration box 25 into alignment with the rest of the periphery of the jig. A push member 49 closes at the same time on the zone of overlap of the edges and against a counter-electrode 50 mounted inside the jig 16 on a vertical slider 51, a jaw 52 articulated on an axis 53 and carrying an electrode 54. The overlapping edges of the blank are then welded together.

After welding of the blank between the two electrodes 50 and 54, along the line of overlap 5, the cam 43 controls withdrawal and opening of the clamp 41, liberating the blank which now forms the body 4 of the receptacle for treatment at station B. The upper edge 9 of the body 4 is then facing a rolling head 55 placed at station B along axis XX.

FIG. 2 shows the head 55 in an intermediate position during its descent; FIG. 5 represents the mechanism for controlling the head at its lower position, and FIG. 6 shows the internal structure of the rolling head in more detail.

The rolling head 55 comprises a unit 56 mounted on a support 57 to pivot about a transverse axis YY defined by two bearings 58 and 59; it may rotate through 180° under the action of a toothed sector 60 integral with a fork 61 which contains a roller 62 of a push rod 63 connected to a cam 64. The rolling head may thus be a lower position at station B facing the jig, or on the other hand, as will be described below, at a higher position facing station C.

The unit 56 carries a mandrel 65 traversed by a shaft 66 carrying a former 67 with which a roller 68 connects it in translation. The former 67 is intended to cooperate with the narrower opening of the body 4 in order to press against the edge 9. The mandrel itself is guided in translation with respect to the unit 56 by two pins 69. The latter also carry a cup 70 held in place by the pin 71 traversing a light 72. The pin 71 serves to support on the two springs 73 and 74 which with respect to the unit 56 return the mandrel in its rest position shown in FIG. 6. The compression of the spring 73 allows the mandrel to advance towards the jig 16 the pin 71 resting in abutment at the bottom. The compression of spring 74 permits it on the other hand to be removed towards the rear when the pin 71 comes to its upper abutment.

The mandrel 65 also carries a plurality of claws 75 articulated on the respective axes 76 and urged to their open positions by the action of springs on push member 77. These claws are intended to effect rolling of the edge 9 which is pressed inwardly by the former 67.

The device is controlled by a sleeve 78 capable of moving freely between the mandrel 65 and an abutment collar 79 integral with the shaft 66. This sleeve is provided with a ramp 80 which comes into contact with the bearings corresponding to claws 75; on the other hand it is guided in two sliders 81 by two lugs 82 and carries two rollers 83 capable of being driven, as will be shown below, by the control forks.

There exist two control forks driven by the same sliding projection 84 visible in FIG. 2; one fork 85 comes into use when the head is at the upper position and it is intended to return the sleeve 78 to its rearward position by recoil of the projection 84 against a cam 86, the other fork 87 comes into play when the head is at its lower position and serves, on the other hand, to advance the sleeve by advance of the projection 84. It will be understood that when the fork 87 displaces the rollers 83 towards the bottom of the assembly shown in FIG. 6, advance of the sleeve 78 firstly causes of the claws 75 owing to the action of the ramp 80 and then when the sleeve arrives in contact with the mandrel 65, drives it towards the bottom as well as the shaft 66 while compressing the spring 73. The mandrel thus advances towards the body 4, engages its edge 9 and effects rolling, whereas the former 67 pushes the interior electrode 50 along it slider as it advances to the inside of the body.

To facilitate rolling the former 67 is rotated by means of the shaft 66. For this purpose the end of this shaft carries a groove and it is mounted to slide inside a conical pinion 88. The latter engages with another pinion 89 connected to a shaft 90 mounted inside bearing 59 and driven in rotation (FIG. 5) by a toothed wheel 91 placed on the column 12, through a transmission provided with a clutch 92 of which the control is effected by two wheels 93 and the cam 94. This control is analogous to that previously described and is not shown in the figures.

It will be seen that rotation of the pinion 88 drives that of the former 67 inside the mandrel 65 and the sleeve 78, with respect also to the jaws 75 and the body 4 supported by the jig 16.

Once the advance of the mandrel has stopped rotation of the former 67 is interrupted; the body 4 is then imprisoned by the rolling head by means of its edge 8; the jig 16 may withdraw abandoning the body 4 which rests supported by the rolling head whereas the cams 86 free the fork 87 which allows the mandrel to retreat under the action of spring 73 to its rest position, the sleeve 78 however still resting on the ramp 80, and thus maintaining closed the jaws 75.

The cam 64 thus controls rotation of the unit 56 to lead the rolling head to its upper position at station C for mounting of the bottom of the pot whereas the wheels 83 engage in the fork 85 still at rest.

The station C comprises (FIG. 7) in the first place a die bed 95, provided with a circular opening 96 of diameter slightly smaller then that of the lower part of the pot and of which the function will be described below. It is fed, from a distributor 97 of known type in which are stacked circular blanks G, by a fork 98 provided with a rack 99 and movable radially along a slider 100 under the action of a demultiplicator pinion 101 placed at the end of a push rod 102 which rotates between the rack 99 and a rack 103 integral with the support 15. A vent 104 placed above the distributor 97 takes up one by one the blanks G which the fork 98 which is now in a position advanced towards the exterior having lifted on the groove 105 when it passes between the distributor and the vent to finally move the blank G along the upper flat 106 of the die bed 95 above the circular opening 95.

Mounting of the bottom of the pot is effected by a welding head which will be described below with reference mainly to FIG. 7. It comprises a clamp 107 having fixed axis of rotation 108, which closes about the end of the body 4 intended for receiving the bottom 6, an end which is now at an elevated position. The clamp 107 opens and closes under the action of two links 109 connected by an axis 110 integral with a push rod 111 driven by cam 112, and it carries two half-electrodes 113.

The clamp 107 is associated with an expandable mandrel 114 mounted by means of an isolating sleeve 115 and a rib 116 on two columns 117 sliding inside bearings 118 integral with support 15 which serve for its guiding and allows its path to be adjusted at will.

The mandrel 114 has four jaws 121, comprising two annular parallel lips 119 and 120 which define a generally conical shape. THe lip 119 is mounted directly at the edge of the mandrel 114 and the distance between the lips 119 and 120 is slightly less than the height of the flange 7 of the bottom 6.

The jaws 121 are formed of two connected pieces 122 and 123, each carrying respectively a section of lips 119, 120 and separated from each other. There thus exists between the different jaws a mounting parallel to the bottom which cooperates with the mounting corresponding to the adjacent jaws so that expansion of mandrel 114 accompanies a translation along this mounting, the jaws resting in contact one with the others. The mandrel also carries a single electrode fed by the four conductors 124.

The mandrel is traversed on the whole of its length by an axial shaft 125 provided at its lower end with a conical support 126 cooperating with the corresponding support of the jaws; the shaft 125 is articulated on a casing 127 itself driven vertically by a transmission comprising a lever 128 connected by a lever 129 connected by a link 130 to a push-rod 131 controlled by the cam 132.

A sliding ring 133 surrounds the mandrel, and is course with respect to the latter is limited by four pins 134 passing through the holes 135; the ring is pressed towards the bottom by a spring 136 and, in its rest position, it masks the end of the mandrel. The mandrel itself is pressed towards the bottom against a shoulder 137 of the shaft 125 by a spring 138 taken between a rib 116 and the upper part of the shaft 125.

Once the roller head 55 is in place at station C in the axis of the mandrel 114 and the clamp 107 is closed on the body 4, at the level of the bottom 6 under the action of the cam 112, the cam 132 causes the shaft 125 to descend accompanied under the action of springs 138 and 136 to the expansible mandrel and by the ring 133.

The welding head thus descends, the jaws 121 being retracted until the ring 133 comes into abutment with the surface 106, thus imprisoning the blank G between its lower face and this surface; the mandrel then continues to descend alone compressing the spring 136 and driving the blank G of which the edge deforms while following the contour of the opening 96 to form a bottom 6 of truncated conical shape having a concavity turned upwards. The mandrel stops descending when the bottom 6 takes the desired position inside the body 4 determined by the abutment of columns 117. The axial shaft 125 then continues to descend alone, it bearing surface at conical support 126 causing expansion of the mandrel 114 and pressing of the wall of the pot against the lips 119, 120 and the half electrodes 113 of the jaw 107; it is thus possible to carry out welding of the bottom; the cam 86 then causes tilting of the fork 85 which drives the housing 78 to a lower position causing opening of the jaws 75 of the rolling head 55 then, when the housing comes into abutment against the collar 79, the return of the former 67 by compression of the spring 74, which liberates the head 55. The latter then tilts escaping from the fork 85 which allows the housing 78 to return to its rest position with the mandrel 65 under the action of the spring 74. The tilting of the head 55 provides on the other hand a space which is free for passage of the conveyor 18, whereas the cam 132 allows remounting of the shaft 125 under the action of spring 131 and disengagement of the conical bearing 126 under the action of spring 138. The jaws 121 then reclose, then the welding head is remounted liberating in its turn the pot which is now driven by the single jaw 107 towards a conveyor 18 whereas the collar 133 returns to its rest position under the action of spring 136. Opening of the jaw 107 finally liberates the pot which is taken away by the conveyor 18.

In the machine which has been described, the soldering operations are effected by dielectric loss as high frequency between the pairs of electrodes 50 and 54 on the one hand, 119, 120 and 113 on the other hand, which has been disclosed above. Each of the complementary electrodes is fed by high frequency currents by means of as many plates 139 which each cooperate with two fixed plates 140 placed on the framework of the machine, with regard to the position where the corresponding station is located at the moment when welding must be carried out. The plates 139 and 140 thus form complementary armatures of the same number of connecting condensers which allows feed of the assembly of the welding stations of the machine by means of a single HF generator placed outside in spite of rotation of the welding members and carrying out commutation of the successive stations corresponding to their rotation.

Thus it is not necessary to use moving contacts which are a source of grave difficulties when transmitting high frequency current. It is preferable that the length of each of the feed plates 140 corresponds to the spacing of the complementary plates 139, that is to say the space which separates the lines of working on the movable turret 11 or a multiple of this separation; in this manner the capacity of the condensers inserted in the circuits of the different positions where welding is carried out retain a constant value throughout rotation of the turret, which allows the tuning of the high frequency circuit to be conserved.

It will be understood that numerous variations of the above described embodiments are possible. In particular it will be appreciated that it would be easy to adapt the two working stations B and C to interchange the welding head and the rolling head if it was desired to manufacture pots having a large opening or to associate with the welding head of station C a welding head mounting at station B on an axis of tilting if the receptacle to be manufactured has a covering. On the other hand it can be seen that if the pot has a different structure, requiring an assembly procedure different from that described above, it would be easy to replace some or all of the HF welding heads by heads of suitable type, such as an induction welding head for applying a cover composed of aluminum foil and polyproylene.

Finally it is possible to feed the bottom-fitting station with pre-formed bottoms or on the other hand to manufacture the blanks G in situ by cutting continuous strips of material.

It should be understood that, whereas the manufacture of conical pots has been described above, the invention is applicable to pots having other shapes, with suitable modifications to the apparatus, without departing from the scope of the invention.

I claim:

1. A method of automatically making thin-walled receptacles comprising a wall defining a body having an aperatures at opposite ends thereof, elements including a curved bottom attached to one end and a cover and border at the other end, the method comprising:
   supplying a first working station with a blank for the body,
   forming the blank into the body on a support having an axis of symmetry at the first working station,
   moving the body on its support along said axis directly from the first working station to a second working station,
   providing one end of the body with one of said elements at the second working station,
   grasping said one end of the body by grasping means at the second working station,
   tilting said grasping means to rotate the body to bring said other end of the body to a third working station,
   providing said other end with another of said elements at the third working station,
   gripping said other end of the body by gripping means,
   removing the body by said gripping means,
   and releasing the body, the aperture of the body at said one end being of a width which is less than or equal to that of the aperture at said other end.

2. A method according to claim 1, in which the element provided at said one end at the second working station is a cover and the bottom is applied to said other end at the third working station.

3. A method according to claim 1, in which the border is provided by rolling the edge of the body on itself around the respective aperture.

4. Apparatus for automatically making thin-walled receptacles having a wall defining a body having apertures at opposite ends thereof, a curved bottom attached to one end and a cover or border at the other end, comprising
   first, second and third working stations;
   said first working station including a jig having an axis of symmetry, means for feeding a blank to said jig, and an exterior clamp for rolling the blank on said jig to form the body,
   said second working station for working on one end of the body including grasping means for grasping the one end and rotating the body to bring the other end of the body to said third working station for working on the other end of the body, said second working station being positioned on said axis of symmetry and mounted to rotate about an axis transverse thereto,
   one of said second and third working stations including rolling means for forming a rolled edge at the end of the body, said rolling means including a mandrel to support the body, external claws to engage the edge of the body, and a shaping member which is rotatable relative to said mandrel and said claws to roll the edge, and the other of said second and third working stations including means for supplying a bottom, a die bed having an opening shaped to receive the bottom, an expandable mandrel associated with a sleeve for gripping the body, clamping means for clamping the bottom and the body together and means for welding the bottom to the body.

5. Apparatus for automatically making thin walled receptacles having a wall defining a body having apertures at opposite end thereof, a first end element being a curved bottom attached to one end and additional end elements, with at least one of said additional end elements, which include a cover and a border, attached at the other end;

the apparatus comprising
a frame;
a plurality of sets of first, second, and third working stations,
each said first working station including
a jig for shaping the body from a blank having an axis of symmetry,
and means for providing blanks to said jig;
each said second working station provided with means applying one of said elements on one end of the body;
each said third working station provided with means applying one of said elements other than said element applied at said second working station to the other end of the body;
said stations being provided with means for displaying the body from one said station to the next said station and each said set situated along an axis of symmetry;
said sets of first, second and third working stations being mounted on a turret which is rotatable with respect to said frame;
said frame having a plurality of cams mounted thereon for controlling said means at said working stations;
pairs of electrodes at at least one of said working stations arranged to weld the receptacle during manufacture of high frequency electric current, at least one of the electrodes of a pair being connected to a plate which is rotatable with said turret, said plate being associated with another plate which is fixed relative to said frame, said plates together forming a condenser in the feed circuit for said electrodes.

6. Apparatus according to claim 5, in which the length in the direction of rotation of the turret of the plate fixed relative to the frame is equal to or an integral multiple of the peripheral separation of the sets of working stations on the turret.

7. Apparatus according to claim 5, in which the stations of the same set are mounted on the turret by the same support member.

8. Apparatus according to claim 5, in which said jig is provided with at least one aspirating member arranged to come into contact tangentially with a blank from a source of blanks to draw the blanks around said jig.

9. Apparatus according to claim 8, in which said jig is rotatable about said axis of symmetry by differential means arranged to immobilize said aspirating member with respect to the source of blanks when said aspirating member comes into contact with a blank.

10. Apparatus according to claim 9, in which said aspirating member comprise a suction box which is pivoted about a horizontal axis and urged to rotate outwardly with respect to said axis of symmetry of said jig by a spring, said box thus projecting outwardly from said jig and presenting a vertical apertured surface of the source of blanks.

11. Apparatus according to claim 9, in which said jig is movable in translation between the source of blanks and said exterior clamp for rolling the blank.

12. Apparatus for automatically making thin-walled receptacles having a wall defining a body having apertures at opposite ends thereof, a first end element being a curved bottom attached to one end and additional end elements, with at least one of said additional end elements, which include a cover and a border, attached at the other end;

the apparatus comprising
first, second, and third working stations; said first working station including
a jig for shaping the body from a blank;
and means for providing blanks to said jig;
said second working station provided with means applying one of said elements on one end of the body;
said third working station provided with means applying one of said elements other than said element applied at said second working station to the other end of the body;
one of said second and third working stations including
means for grasping the body,
and a mandrel having a longitudinal axis and provided with radially movable gripping members,
said mandrel being movable along its axis and being connected elastically to a fixed position along its axis,
and means including a conical member arranged to cause opening and closing of said gripping members at the ends of the path of the mandrel along its axis,
said mandrel being rotatable between an upper and a lower position,
and two control forks to actuate opening and closing of said gripping members when said mandrel is at said upper and lower positions respectively.

* * * * *